(12) United States Patent
Salehi et al.

(10) Patent No.: US 6,844,947 B2
(45) Date of Patent: Jan. 18, 2005

(54) ALL-OPTICAL HOLOGRAPHIC CODE DIVISION MULTIPLE ACCESS SWITCH

(76) Inventors: Jawad Ahmed Salehi, 6052 Charles Edward Terr., Columbia, MD (US) 21045; Mohammad Abtahi, 19 Behnam st., Kashani Bld., Tehran, 1471884487 (IR)

( * ) Notice: Subject to any disclaimer, the term of this patent is extended or adjusted under 35 U.S.C. 154(b) by 52 days.

(21) Appl. No.: 10/335,811

(22) Filed: Jan. 2, 2003

(65) Prior Publication Data

US 2003/0133174 A1 Jul. 17, 2003

Related U.S. Application Data

(60) Provisional application No. 60/348,279, filed on Jan. 15, 2002.

(51) Int. Cl.$^7$ ................................................. G02B 5/32
(52) U.S. Cl. ........................... 359/15; 359/29; 359/559; 382/210; 382/211
(58) Field of Search ............................. 359/11, 15, 29, 359/559–561, 107, 108; 382/210, 211

(56) References Cited

U.S. PATENT DOCUMENTS

| | | | |
|---|---|---|---|
| 5,216,529 A | | 6/1993 | Paek et al. |
| 5,317,651 A | * | 5/1994 | Refregier et al. ............ 382/210 |
| 5,969,871 A | * | 10/1999 | Tidwell et al. ............... 359/620 |

OTHER PUBLICATIONS

K. Takasago et al., "Spatial–phase code–division multiple––access system with multiplexed Fourier holography switching for reconfigurable optical interconnection", Applied Optics 39(14), pp. 2278–2286(2000).*

Weiner et al, "Programmable Shaping of Femosecond OPtical Pulses by Use of 128–Element Liquid Crystal Phase Modulator", IEEE Journal of Quantum Electronics, vol. 28, No. 4, Apr. 1992, pp. 908–920.

Takasago et al, "Spatial–phase code–division multiple–access system with multiplexed Fourier holography switching for reconfigurable optical interconnection", Applied Optics, vol. 39, No. 14, May 10, 2000, pp. 2278–2286.

Crossland et al., "Holographic Optical Switching: The ROSES Demostrator" Journal of Lightwave Technology, vol. 18, No. 12, Dec., 2000, pp. 1845–1854.

* cited by examiner

*Primary Examiner*—Leo Boutsikaris
(74) *Attorney, Agent, or Firm*—John T. Peoples

(57) ABSTRACT

A technique for processing optical input signals to produce optical output signals using only a single hologram for a plurality of circularly shifted code words used to encode the input signals. A spatial light modulator coupled to the each of the optical input signals encodes a corresponding one of the input optical signals, and the optical signals are linear combined for further processing. A matched filter composed of the single hologram receives the linear combination, and a two-dimensional microlens arrangement coupled to the matched filter emits each of the optical output signals from a corresponding microlens in the arrangement. Switching is engendered by controlling each spatial light modulator to thereby direct each input signal to the desired one of the microlens in the arrangement.

18 Claims, 18 Drawing Sheets

| 1 | 1 | 0 | 0 | 1 | 0 | 1 | 0 |
|---|---|---|---|---|---|---|---|
| 0 | 0 | 1 | 0 | 0 | 1 | 0 | 1 |
| 1 | 0 | 0 | 0 | 1 | 0 | 0 | 1 |
| 0 | 1 | 0 | 1 | 0 | 1 | 1 | 0 |
| 1 | 0 | 1 | 0 | 0 | 1 | 0 | 1 |
| 1 | 0 | 1 | 1 | 0 | 0 | 1 | 0 |
| 0 | 1 | 1 | 0 | 1 | 0 | 1 | 1 |
| 1 | 1 | 0 | 1 | 1 | 1 | 0 | 0 |

151

| 1 | 0 | 1 | 1 | 0 | 0 | 1 | 0 |
|---|---|---|---|---|---|---|---|
| 0 | 1 | 0 | 0 | 1 | 0 | 0 | 1 |
| 0 | 1 | 1 | 0 | 0 | 0 | 1 | 0 |
| 1 | 0 | 0 | 1 | 0 | 1 | 0 | 1 |
| 0 | 1 | 1 | 0 | 1 | 0 | 0 | 1 |
| 1 | 0 | 1 | 0 | 1 | 1 | 0 | 0 |
| 1 | 1 | 0 | 1 | 1 | 0 | 1 | 0 |
| 0 | 0 | 1 | 1 | 0 | 1 | 1 | 1 |

ALL-OPTICAL HOLOGRAPHIC CODE DIVISION MULTIPLE ACCESS SWITCH

CROSS REFERENCE TO RELATED APPLICATION

This application is a non-provisional application of provisional application Ser. No. 60/348,279 filed Jan. 15, 2002.

BACKGROUND OF THE DISCLOSURE

1. Field of the Invention

This invention relates generally to an all-optical Code Division Multiple Access (CDMA) system and, more particularly, to a methodology and a concomitant system for a holographic CDMA switch.

2. Description of the Background Art

The ever-increasing demand for very high rate services is driving the evolution of future telecommunication infrastructure towards an all-optical network. In effect, an all-optical network is a network in which there is no conversion of optical signals to electrical signals for establishing key network functions. Among many network functions in an all-optical network that need to be implemented in the optical domain is the interconnection/switching system.

Globally, optical interconnections may be categorized as either material-guided light switches or free-space optical switches, with the latter being more powerful because of their high-density connectivity arising from spatial parallelism and three-dimensional structure. Among various types of free-space photonic switches, optical switches based on holographic techniques have been recently introduced. For example, the article entitled "Holographic Optical Switch: The Roses Demonstrator" by W. A. Grossland et. al., IEEE Journal of Lightwave Technology, Vol. 18, No. 12, December 2000, reports the results of a demonstration of a prototype 1×8 free-space switch using re-configurable holograms. The space-variant optical interconnection system based on spatial-phase CDMA technique with multiplexed Fourier holography has been described in the article entitled "Spatial-phase code-division multiple-access system with multiplexed Fourier holography switching for reconfigurable optical interconnection", by Takasago et al., Applied Optics, Vol. 39, No. 14, May 2000, where a one-dimensional phase code has been used and a routing pattern has been recorded in a Fourier hologram in order to decode and route simultaneously the signals into the specific addresses. The performance of this switch measured by the signal-to-noise ratio is about 5 for managing more than 250 routing patterns.

However, the art is devoid of a simple free-space switch with: (1) better performance and less loss than known optical switches; (2) a high processing gain; and (3) simplicity of two-dimensional signature code generation.

SUMMARY OF THE INVENTION

These shortcomings and other limitations and deficiencies are obviated in accordance with the present invention by free-space optical switch, and concomitant method, based on the holographic CDMA technique, which is a spread-space CDMA technique—in contrast to conventional spread-spectrum and spread-time techniques.

In accordance with a broad system aspect of the present invention, a system for processing optical input signals to produce optical output signals includes: (1) a spatial light modulator coupled to the each of the optical input signals for encoding the corresponding one of the input optical signals; (2) a combiner for generating a linear combination of the optical signals emitted by each modulator; (3) a matched filter composed of a single hologram for receiving the linear combination; and (4) a two-dimensional microlens arrangement coupled to the matched filter wherein each of the optical output signals is obtained from a corresponding microlens in the arrangement.

In one preferred embodiment, the encoding is effected with a circularly shifted code set.

Broad method aspects of the present invention are commensurate with the aforementioned broad system aspects.

BRIEF DESCRIPTION OF THE DRAWINGS

The teachings of the present invention can be readily understood by considering the detailed description in conjunction with the drawings, in which:

FIG. 3 lists the array of (0,1) pixels from an exemplary holographic mask;

To facilitate understanding, identical reference numerals have been used, where possible, to designate identical elements that are common to the figures.

DETAILED DESCRIPTION

1. Background

Figure 1:
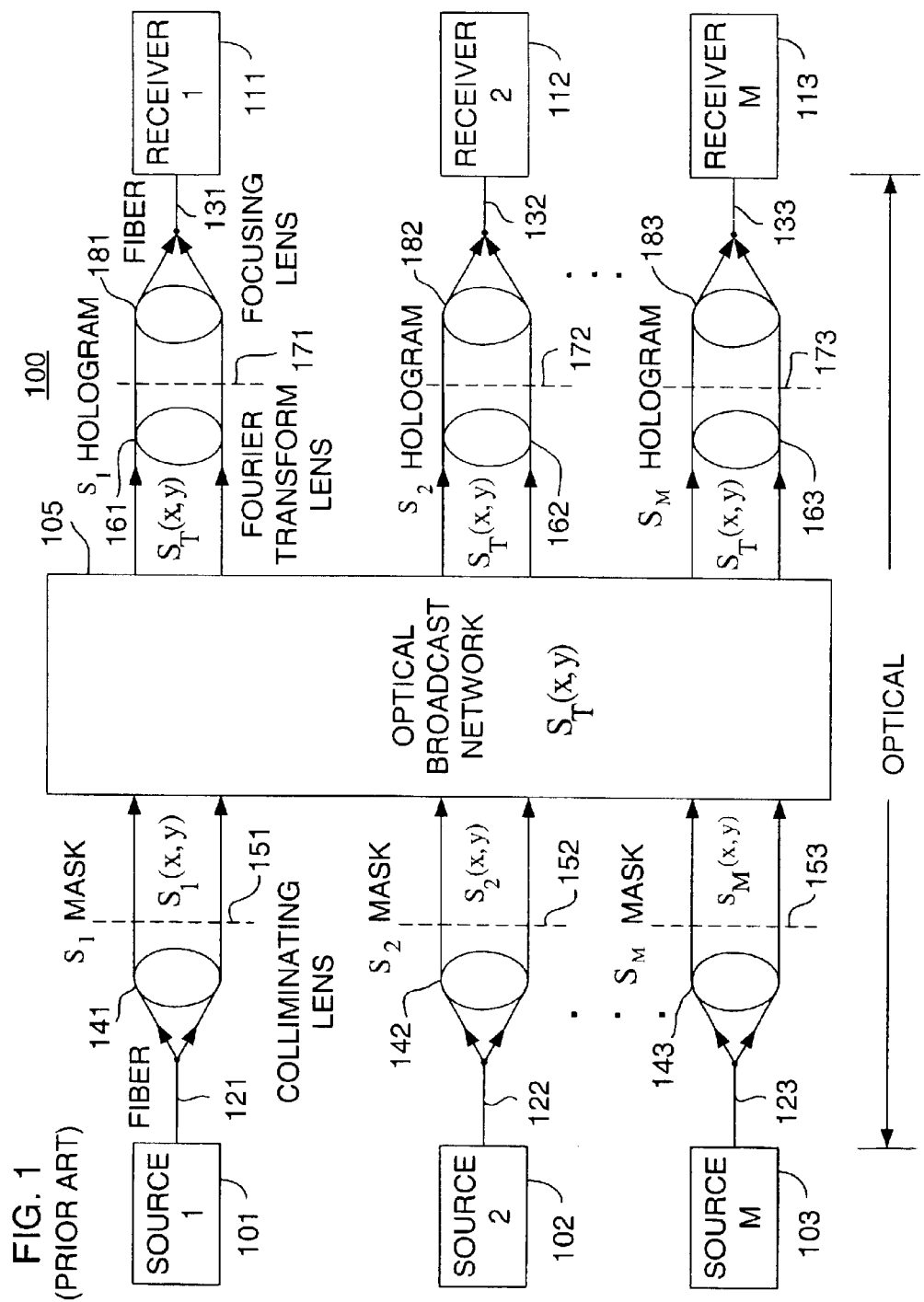
FIG. 1 is a diagram of a prior art all-optical spread-space code division multiple access system which serves as a backdrop to present inventive subject matter.

To elucidate the principles in accordance with the present invention, it is indeed instructive to first cover in an overview manner the foundational principles of a holographic CDMA system. These teachings have been set forth in detail in U.S. Pat. No. 5,216,529, which has one inventor in common with the inventor of the present subject matter (namely, J. A. Salehi). The teachings of '529 are incorporated herein by reference, but are disclosed in sufficient detail so as to make the present description essentially self-contained. Moreover, only the teachings that are especially pertinent to the present inventive subject matter are set forth hereinafter.

Overview Background

The conventional techniques of spread-spectrum and spread-time CDMA spread the energy of the information signal over a wide frequency band or over a long time period, respectively.

The '529 patent teaches a technique, referred to generically as spread-space CDMA, wherein energy of the information signal is spread over a large spatial domain. In general, spreading the energy of a given information signal and the subsequent despreading of the energy is known as encoding and decoding of the information signal. Therefore, in the spread-spectrum technique, encoding and decoding are obtained in time domain, and in the spread-time technique, encoding and decoding are obtained in frequency domain, whereas in the spread-space technique, encoding and decoding are obtained in spatial domain.

In both spread-spectrum and spread-time CDMA techniques, information waveforms (modulating signals) are represented as digital signals, i.e., they exclude the use of analog signals, and all users have identical bit rate and signal format. However, in spread-space CDMA technique, the modulating signal for each user can take on any form (digital or analog), any rate, and any shape. For example, in a multiuser environment a particular user can be sending analog video while other users are sending digitized voice, analog voice, low rate data, and a very high rate data signal. This means that the spread-space CDMA technique remains transparent to the form of modulation format of each user. This advantage is obtained by transferring the CDMA encoding and decoding to spatial domain while modulating the information signal in the time domain.

Processing Gain (PG) for spread-spectrum and spread-time systems is defined as the ratio of total transmitted bandwidth (basically, a function of encoding and decoding speed) to the information bandwidth. Processing Gain is the single most important design parameter in any CDMA system. Its value puts a limit on the number of users that can operate simultaneously in a CDMA system. To increase the number of users in a CDMA system from a given value (operating at some bit-error rate), the PG for that system must increase. There are two ways to increase the PG. First, by increasing the channel bandwidth (that is, the encoding and decoding speed), or second, by reducing the information rate. In optical networks where channel bandwidth is not as scarce a commodity as in other systems, one may design all-optical encoders and decoders that have speeds which are 3 to 4 orders of magnitude faster than the information source. But, in CDMA systems, such as in radio cellular telephony, channel bandwidth is finite and scarce. Thus, reducing the information rate may prove to be the only realistic alternative. The difficulty in increasing PG, thereby increasing the number of simultaneous users, with the spread-spectrum and spread-time CDMA techniques is due to their dependency on the input information rate. However, the uncoupling between the two domains of signal processing, i.e., spatial domain for CDMA encoding and decoding and time domain for information modulation, contributes to another and a very important feature in spread-space CDMA, namely, the uncoupling of the PG from its input information rate. That is, input information rate for each user can be different while the PG for all the users is the same. Processing Gain in an optical spread-space CDMA, which will be discussed in more detail below, is proportional to the number of pixels in a mask and the value of PG is independent of input information rate or from any modulation format. The number of distinct pixels in a mask of area A can be as high as $A/\lambda^2$ where $\lambda$ is the wavelength of the light used in the system. For A=1 cm$^2$ and typical operating wavelengths (1–2 microns) this corresponds to a PG of $10^6$–$10^8$ for a spread-space CDMA system. Since the PG for typical spread-spectrum or spread-time CDMA techniques is $10^2$–$10^3$, then spread-space CDMA can potentially support 4 to 5 orders of magnitude more users. For example, if one to ten percent of PG is taken as the number of users that can be supported by any of the CDMA techniques, then spread-space CDMA can support as many as tens of thousands to a few million users where each user can utilize any input information rate and any modulation format.

Illustrative Embodiment of Background System

Spread-space CDMA system 100, depicted partly in block diagram form and partially in component form in FIG. 1, interconnects sources 101, 102, . . . 103 to receivers 111, 112 . . . 113, respectively. (System 100 may also be referred to as a Holographic CDMA system for reasons that will become apparent as the description proceeds.) Each source 101, 102, or 103 can produce either analog or digital signals, may operate at an arbitrary information rate, and need not be compatible with the other sources. Moreover, the information generator included within each source (not explicitly shown), such as a voice signal or a TV camera, may be electronic so that each source 101, 102, or 103 would include an electro-optical interface to its corresponding fiber medium. Each receiver 111, 112, or 113, which is matched to a corresponding source in the sense that each receiver is arranged to detect the analog or digital format at the incoming information rate, either electronically or electro-optically depending on the original information generator at the corresponding source.

Figure 2:
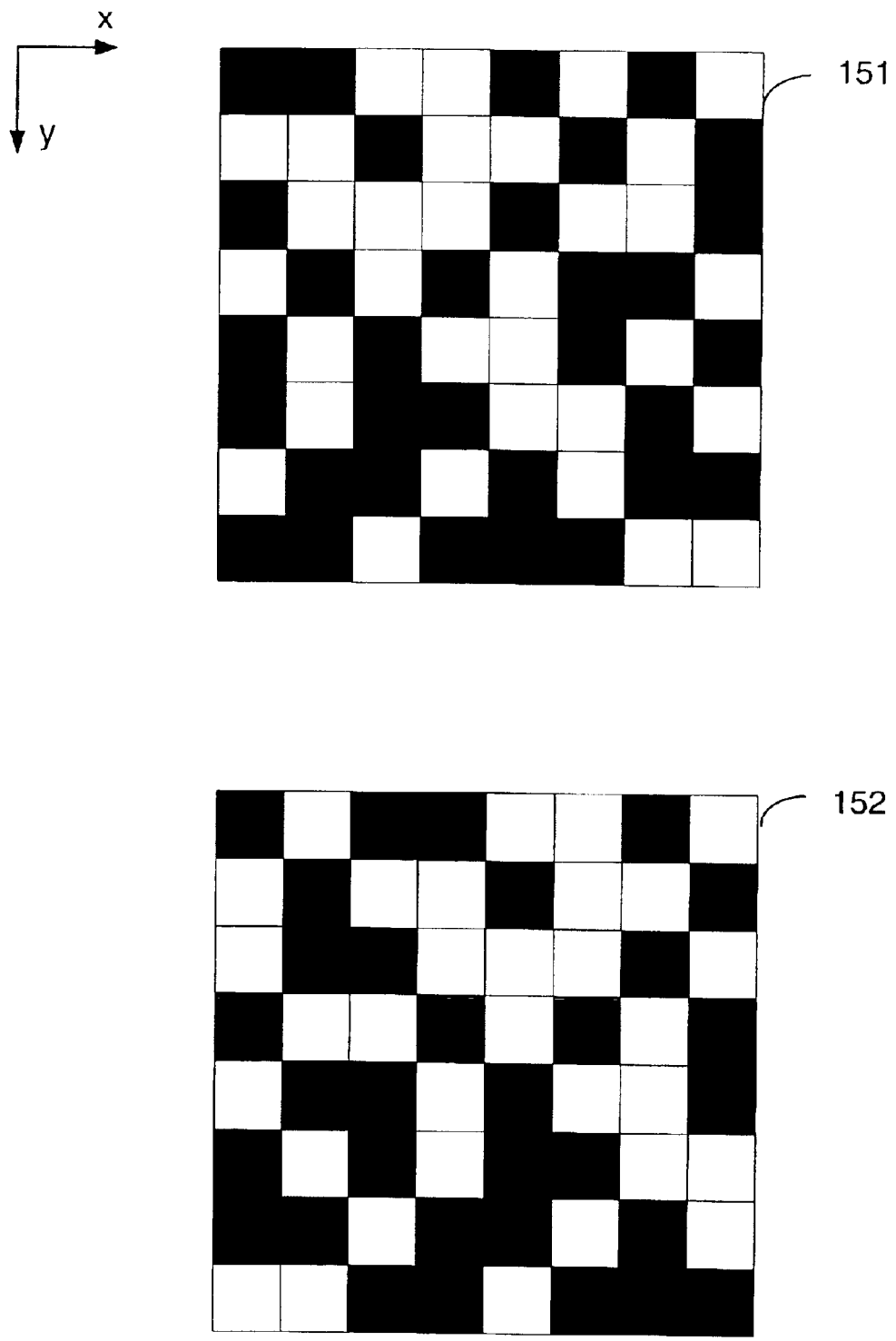
FIG. 2 illustrates two holographic masks assigned to first and second source-receiver pairs.

Since each source 101, 102, or 103 is arranged with an interface so as to propagate an optical signal representative of the information content of the source, a monochromatic light signal is propagated onto a fiber optic medium associated with each source; for example, source 101 launches a monochromatic light signal onto fiber 121. Holographic encoding for the monochromatic light signal emanating from fiber 121 is obtained by: (1) collimating the monochromatic light signal with collimating lens 141; and (2) modulating the collimated monochromatic light signal emerging from lens 141 with a two-dimensional mask 151 having an array of two-dimensional code elements, that is, modulation is obtained by placing mask 151 behind collimating lens 141. Mask 151 has a transmission characteristic which is proportional to a two-dimensional code. Exemplary code elements are members the set (0,1), where a 0 corresponds to opaque area on mask 151 and a 1 corresponds to a transparent area on mask 151. (Another exemplary set is (+1,−1), where +1 corresponds to transmission with zero phase shift, and −1 corresponds to transmission with a π phase shift). Two typical two-dimensional codes, designated $s_1(x, y)$ and $s_2(x, y)$, where x and y are spatial coordinates, are shown in FIG. 2, and illustratively correspond to masks 151 and 152, respectively. For each exemplary mask 151 or 152, there are 64 (8×8) pixels, that is, the code length for each mask is 64. The 8×8 pixels array for masks 151 and 152 are shown in FIG. 3. It is possible to have as many as $10^6$–$10^8$ pixels in a 1 cm by 1 cm mask.

The two-dimensional codes for Holographic CDMA can be obtained from binary sequences of length n, whose autocorrelation is either 1 or −1/n by conventional methods. The two-dimensional codes generally are chosen to satisfy the requirements of randomness and have autocorrelation and crosscorrelation properties that are necessary for the family of two-dimensional codes used for Holographic CDMA systems. For a pseudorandom array (a two-dimensional code with flat autocorrelation function) with n pixels there are n different arrays, with each array obtained simply by considering each shift of the original array to be a different array. Then for a Holographic CDMA system with M users, where M≦n, each shift can be assigned to a different source/user in system 100.

The light signals transmitted through masks 151–153 in FIG. 1, designated as $S_1(x, y)$, $S_2(x, y)$, and $S_M(x, y)$, respectively, serve as inputs to optical broadcast network 105. Network 105 is arranged to form a composite signal, designated $S_T(x, y)$, which has the following form:

$$S_T(x, y) = \sum_{i=1}^{M} S_i(x, y), \tag{1}$$

where M is the number of sources/users. Thus $S_T(x, y)$ is a linear combination of all the modulated light signals transmitted by masks 151–153.

Figure 4:
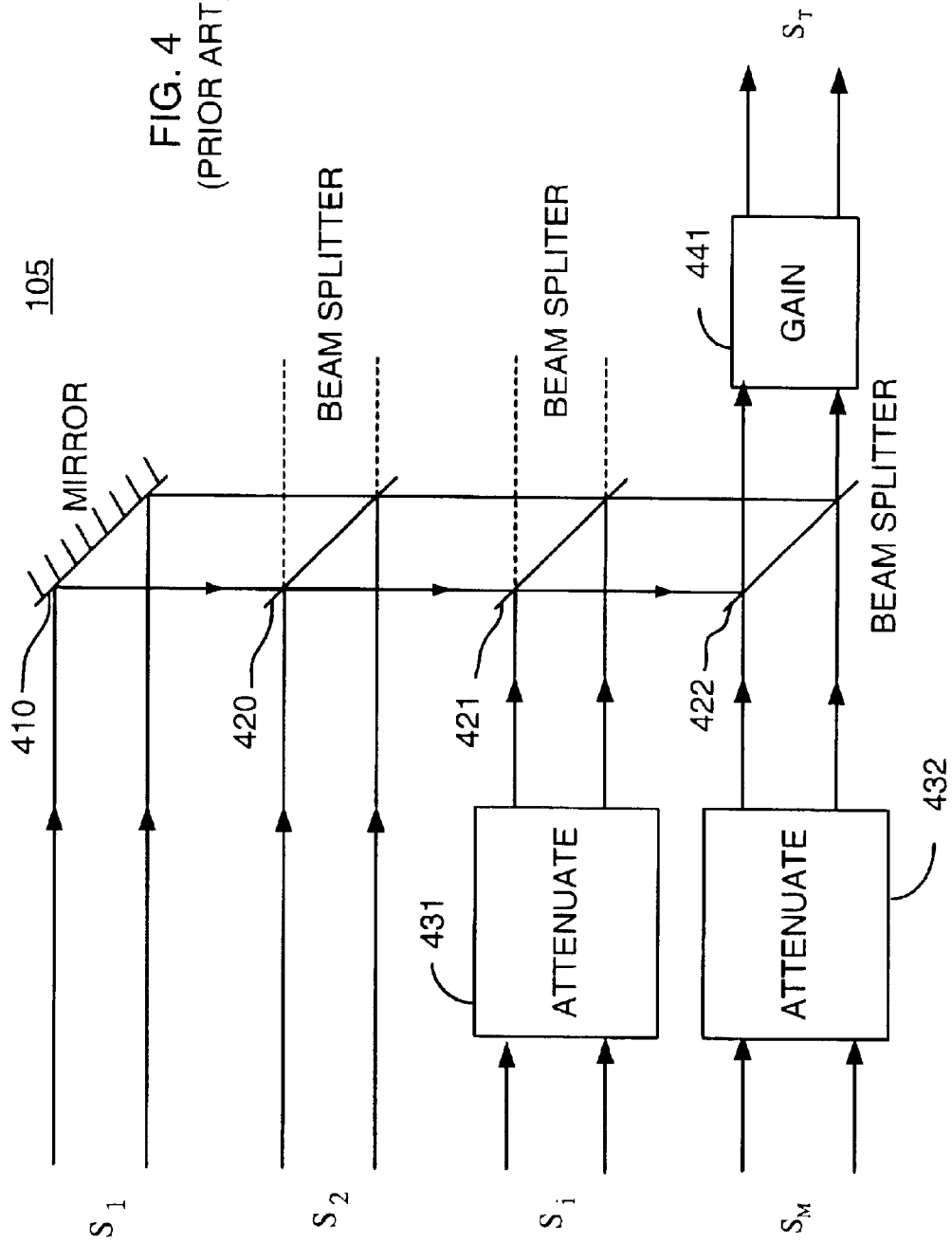
FIG. 4 depicts an illustrative embodiment of an optical broadcast network used to form a composite light signal of FIG. 1.

The arrangement of FIG. 4 depicts an illustrative embodiment for optical broadcast network 105 of FIG. 1. Optical signals $S_1, S_2, S_i, S_M$ and (the argument (x,y) for each signal has been dropped for ease of presentation), serve as inputs to network 105. $S_1$ is reflected from mirror 410 onto beam splitter 420. $S_2$ also impinges on beam splitter 420 so that the output from splitter 420 in the downward direction towards beam splitter 421 may be expressed as $(S_1+S_2)/2$. $S_i$, that is, the signal originating from the $i^{th}$ source (not shown explicitly in FIG. 1) and impinging on network 105, passes through attenuator 431 and excites beam splitter 421 in the horizontal direction. The attenuator is set to 0.5 so that the signal emanating from splitter 421 is the downward direction towards beam splitter 422 is expressed as $(S_1+S_2+S_i)/4$. Finally, $S_M$ is passed through attenuator 432, with its attenuation value set at 0.25, and impinges on beam splitter 422 along with the output of splitter 421. The composite signal emerging from splitter 422 in the horizontal direction, which may be represented by $(S_1+S_2+S_i+S_M)/8$, is passed through optical gain device 441. If device 441 has a gain of 8.0, then the signal emerging from device 441 is $S_T(x, y)$ as defined in equation (1).

Again with reference to FIG. 1, composite signal $S_T(x, y)$ emerges on M optical paths from network 105. The first output optical path feeds $S_T(x, y)$ to Fourier Transform lens 161. Hologram 171, also labeled as $S_1$ Hologram in FIG. 1, is placed at the focal length distance ($F_L$) behind lens 161. The signal transmitted through hologram 171 is intercepted by focusing lens 181 placed in a strategically located position behind hologram 171; the precise placement will be discussed below shortly. Lens 181 delivers a demodulated optical signal to fiber 131, and in turn, fiber 131 propagates this demodulated optical signal to receiver 111. The combined operation of the cascade of Fourier Transform lens 161, hologram 171, and focusing lens 181 is referred to as optical holographic CDMA decoding using an optical matched filter. Holographic CDMA decoding is obtained by arranging lens 161, hologram 171 and lens 181 to implement the optical matched filter; this filter maximizes the ratio of peak signal energy to rms noise and has a transfer function which is the complex conjugate of the code image spectrum.

Figure 5:
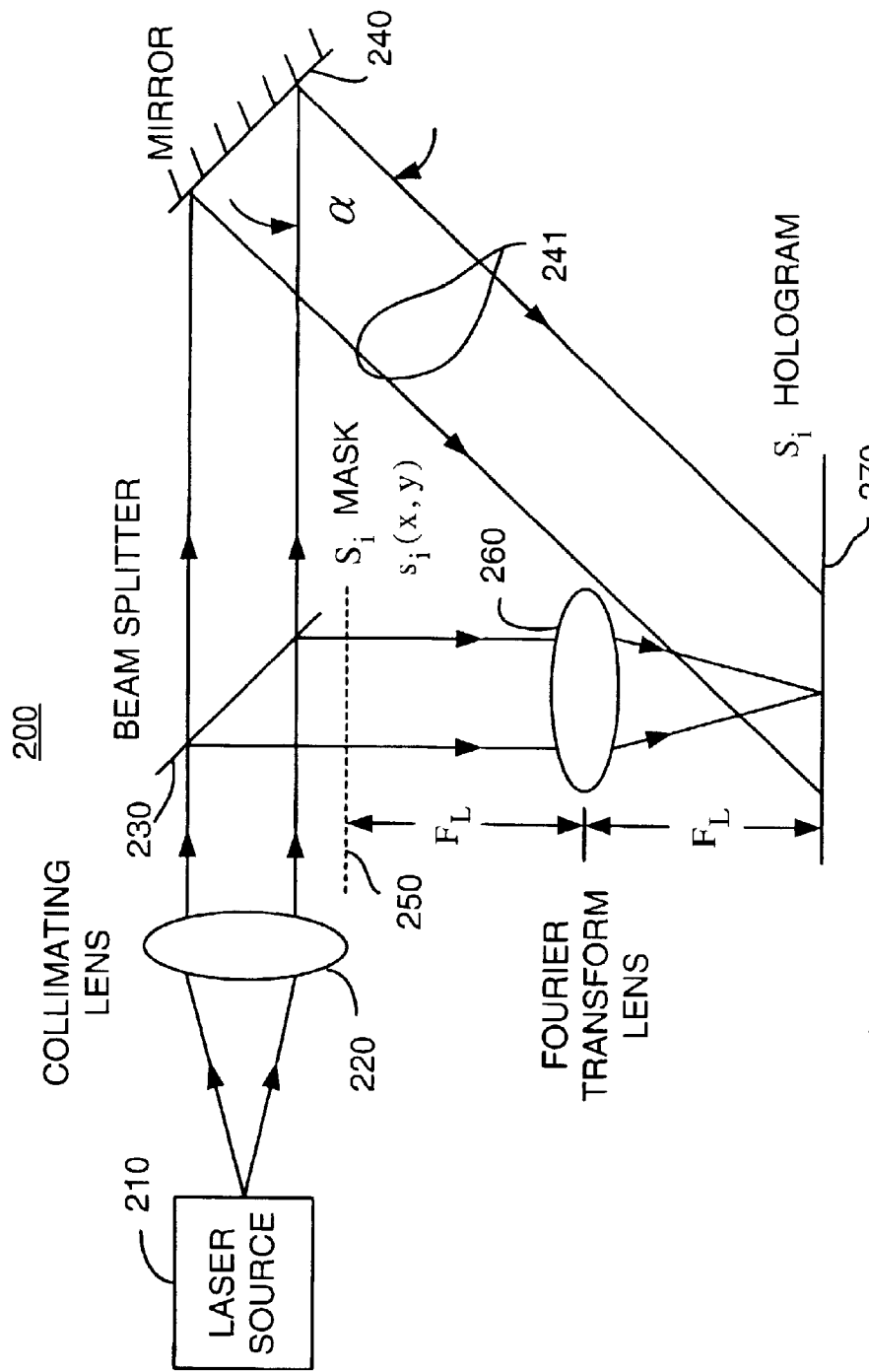
FIG. 5 is an arrangement for generating unique holograms used in optical matched filters.

With reference to FIG. 5, there is shown hologram generator arrangement 200 for generating each $S_i$ Hologram for the $s_i(x, y)$ mask, i=1,2, . . . M, of FIG. 1. Arrangement 200 uses reference beam 241 to interfere with the output of Fourier transform lens 260 at hologram 270. Hologram 270 is any medium that registers light intensity, such as photographic film. Laser source 210, which is illustratively an argon laser operating at 514.5 nm, illuminates collimating lens 220; in turn, the output of lens 220 is directed to beam splitter 230, with the horizontally transmitted component impinging on mirror 240 and the vertically deflected beam being modulated by mask 250 representative of array $s_i(x, y)$, i=1, 2, . . . , or M. The angle of light signal 241 reflected by mirror 240 is α. The output light from mask 250 impinges on Fourier Transform lens 260. Finally, both the light signal from lens 260 and the reflected light from mirror 240, shown as beam 241, are focused on hologram 270. Arrangement 200 creates the desired intensity pattern on hologram 270 so that when each hologram representative of each unique $s_i(x, y)$ mask is embedded in system 100 of FIG. 1, matched filter detection may be effected.

Again with reference to FIG. 5, if $F_i(p, q)$ denotes the output of lens 260, which displays a light signal which is the Fourier transform of $s_i(x, y)$ at its back focal plane, with p and q representing spatial frequency, and if R(p,q) represents the light coming from mirror 240, with R(p,q)=|R(p,q)|exp(jϕ(p,q)), where |R(p,q)| is a constant and ϕ(p,q) is linear in phase, then the intensity pattern on the holographic recording film is, $$H(p, q) = |R(p, q) + F_i(p, q)|^2 \tag{2}$$

$$= |R(p, q)|^2 + |F_i(p, q)|^2 + R^*(p, q)F_i(p, q) + R(p, q)F_i^*(p, q).$$

The fourth term in equation (2) represents the desired filter function, $F_i^*$ (p, q), multiplied by the linear phase factor of R(p,q) since |R(p,q)| is constant.

Once the matched filters, that is, the holograms, for different codes are sequentially produced beforehand by hologram generator 200, the holograms are then physically located at the receiving end of system 100, namely, as holograms 171, 172, 173.

Figure 6:
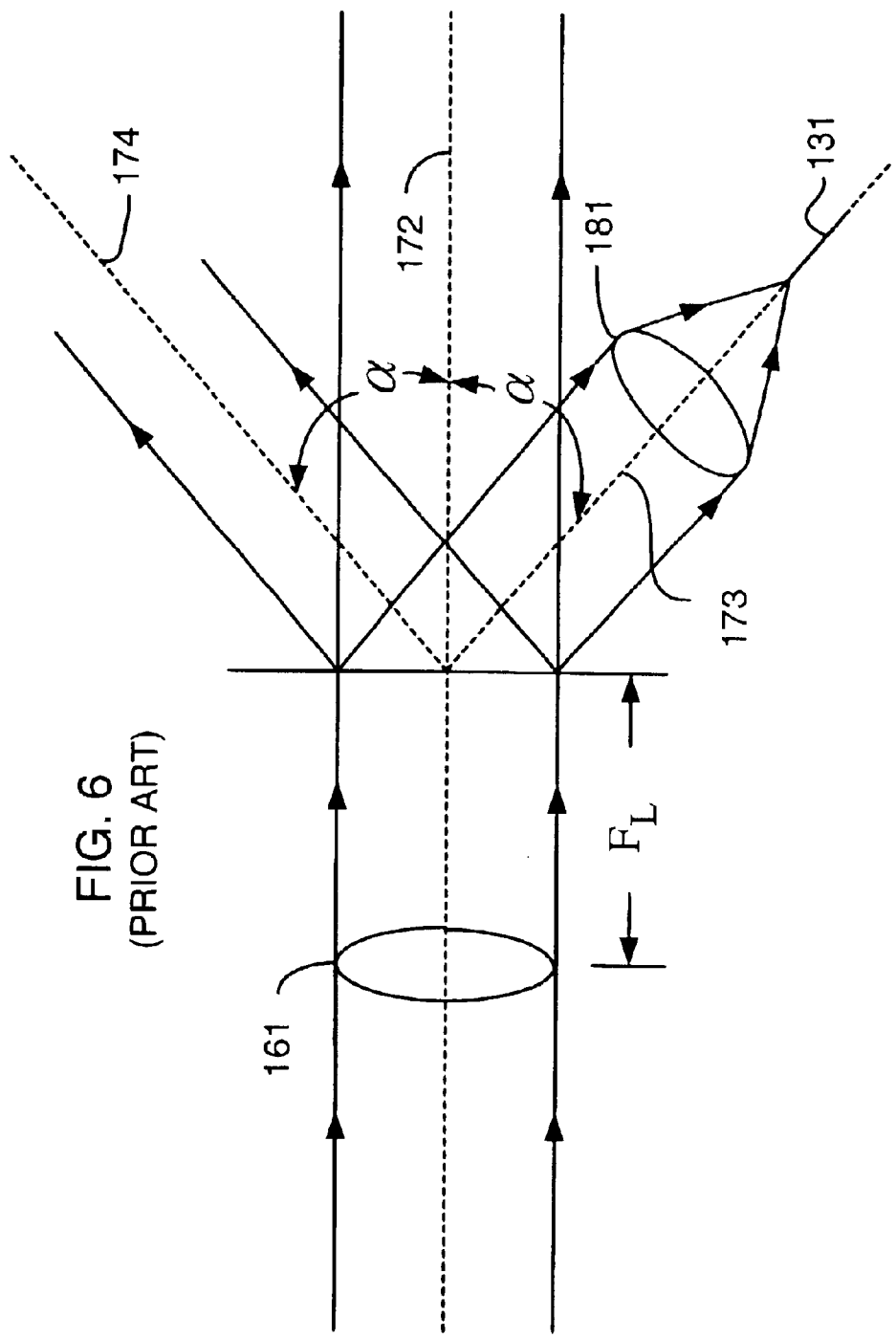
FIG. 6 illustrates the placement of collimating lens relative to the hologram of each decoding arrangement to achieve matched filter detection.

The exact placement of, for example, focusing lens 181 relative to hologram 171 in FIG. 1 is depicted in detail in FIG. 6. It can be demonstrated that the first two terms from equation (2) give rise to a light beam aligned with optical axis 172 of FIG. 6. For purposes of decoding, this light signal is ignored. Another transmitted light beam emerges from hologram along optical axis 173 which is offset from optical axis 172 by the downwardly directed angle α. This light signal along axis 173 is the output from the optical matched filter and corresponds to the fourth term in equation 2. Finally, for completeness, the third term in equation (2) corresponds to the beam emerging from hologram 171 along optical axis 174 at an upward angle α, and this beam is also ignored.

Briefly, by way of an operational description, the component $S_1(x, y)$ present in $S_T(x, y)$ will have a wavefront curvature which will be brought into focus by Fourier Transform lens 181 to thereby generate a bright intensity light signal focused at the input to fiber medium 131; this focusing occurs since $S_1$ hologram 171 is matched to mask 151, that is, the $s_1(x, y)$ mask.

On the other hand, when, for example, light component $S_2(x, y)$ in the composite signal $S_T(x, y)$ is incident on the hologram 171, the output will have a random-like wavefront curvature which will not be brought to a bright focus by the Fourier Transform lens 181. If it is assumed the properly decoded signal has a bright spot with intensity one, any other signal present in the composite signal will have, on average, an intensity 1/NL where NL=n is the number of pixels in a mask (code) with N×L dimensions. The large contrast in the intensities between a matched, decoded signal and an unmatched, decoded signal is used to distinguish between correctly and incorrectly addressed signals, that is, to distinguish among sources.

Figure 7A:
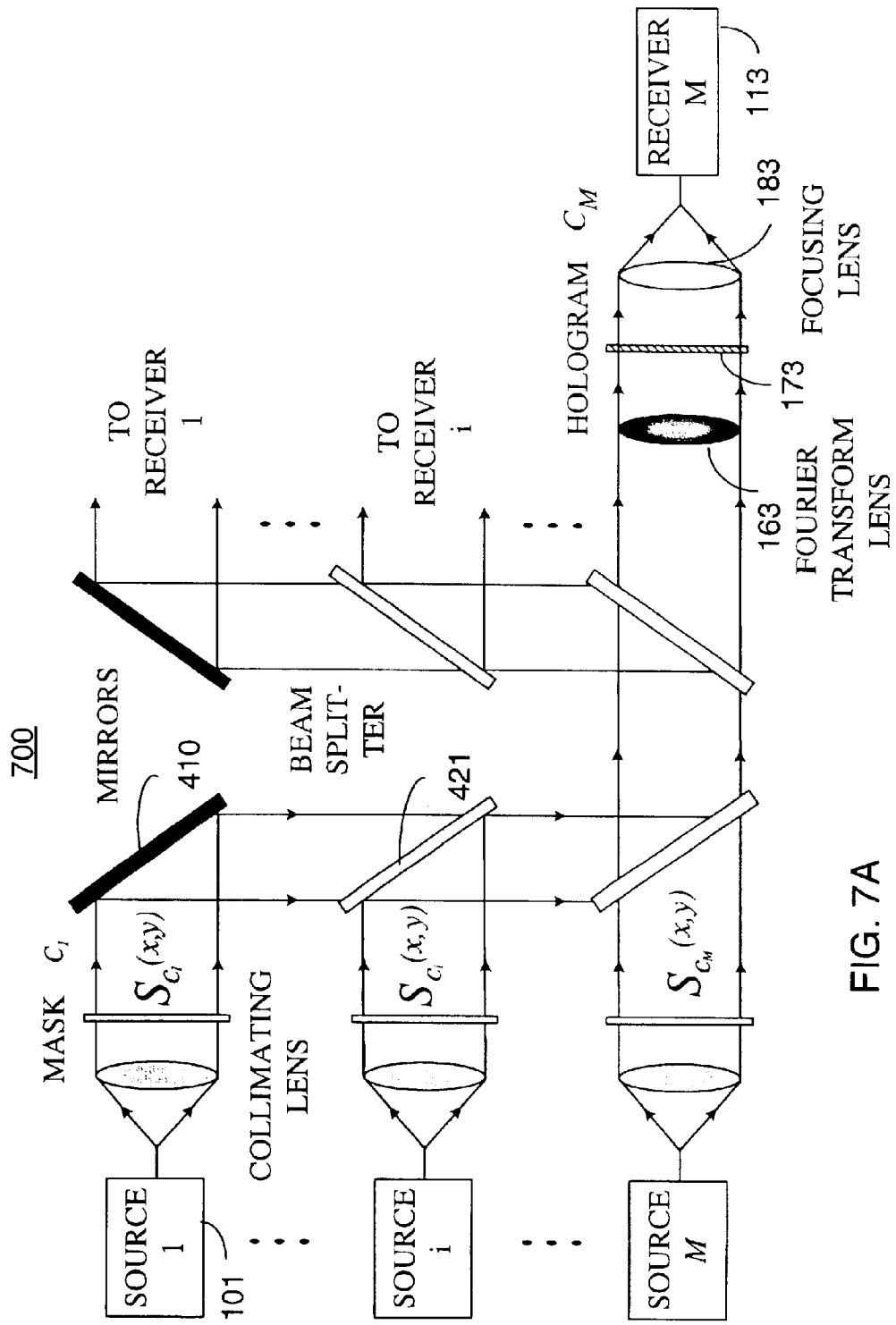
FIG. 7A is an elaboration on the high-level block diagram of the optical network shown in FIG. 1.

1.2 Heuristic Example of a Holographic CDMA Optical Switch Extrapolated from the Holographic CDMA Switch Consider optical system 700 of FIG. 7A, which elaborates on the high-level block diagram of FIG. 1 using the details shown in or easily implied from FIG. 4. In particular, FIG. 7A shows the manner in which the teachings of FIG. 4 can be deployed at both the input and output of the high-level diagram of system FIG. 1 to generate a component-level realization of the Holographic CDMA system. It is readily appreciated that system 700 operates in a manner described in detail in Section 1.1. (Note that a new notation has been introduced which is used later to explain the principles of the present invention, that is, $S_{C_i}(x, y)$ is used in place of $S_i(x, y)$, where $C_i$ represents the $i^{th}$ code word.)

To effect a switching function using system 700, that is, wherein each input source 1, 2, ..., M is able to deliver its optical signal to any output receiver 1, 2, ..., M (e.g., source i can be switched to receiver j), suppose each mask is programmable. A programmable mask can be implemented using a spatial light modulator (SLM) which is based upon liquid crystal display technology. Details of the realization of an SLM are reported, for instance, in the article "Programmable shaping of femtosecond optical pulses by use of the 128-element crystal phase modulator", by Weiner et al., IEEE Journal of Quantum Electronics, Vol. 28, pp 908–920, April, 1992.

Figure 7B:
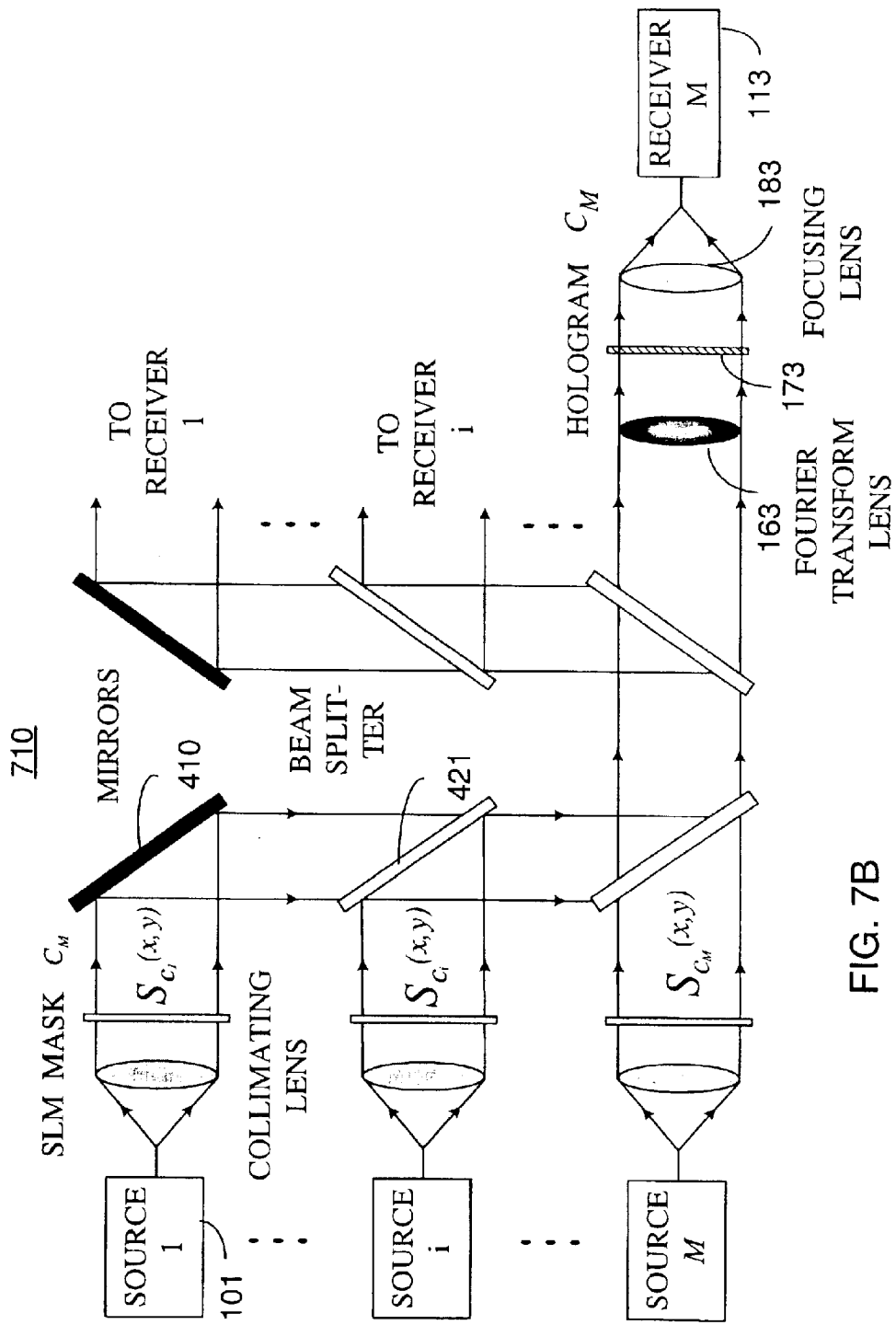
FIG. 7B is an illustrative high-level block diagram of a heuristic optical CDMA switch extrapolated from the network of FIG. 7A.

Accordingly, now consider system 710 of FIG. 7B wherein each mask is programmable as an SLM and, for exemplary purposes, the mask formerly referenced by the code word $C_1$ is now been programmed to represent the code word $C_M$. Then the signal arriving from Source 1 will appear at the Receiver M (instead of Receiver 1 as in FIG. 7A). Using SLM's to realize each mask converts the system 700 of FIG. 7A to the optical switching system 710 of FIG. 7B. However, system 710 is somewhat rudimentary, and has possible shortcomings. For instance, the output portion of system 710 requires M-1 beam splitters, one mirror, and M different holograms, each representing one of the code words employed in the system. The structure of system 710 is not efficient because of the number of components and because optical paths can be inordinate.

1.3 Illustrative Embodiment of a System Architecture for the Present Invention

The foregoing description of the Holographic CDMA system in Section 1.1 and the heuristic example of Section 1.2 serve as the point of departure for the present invention, referred to generically as the "Holographic CDMA Switch".

Figure 8:
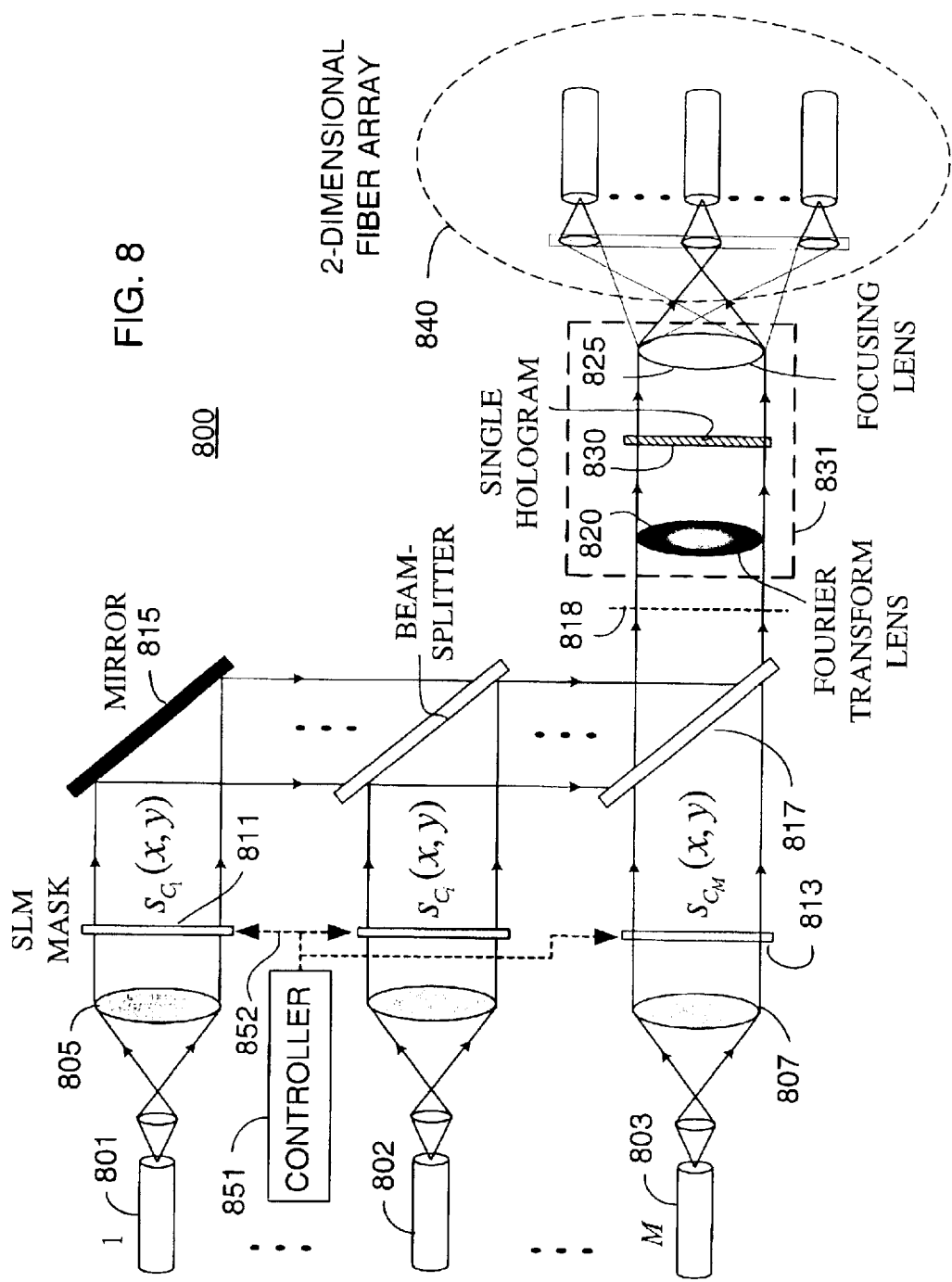
FIG. 8 is a high-level block diagram of a holographic optical switch in accordance with the present invention.

Now with reference to FIG. 8, there is shown an illustrative system 800 for the Holographic CDMA Switch. In FIG. 8, M input fibers 801, 802, ..., 803 each carrying analog or digital signals with different bit rates, are the inputs to all-optical switch 800 based on Holographic CDMA. Using spatial optical signal processing techniques, the output light of each input fiber 801, 802, ..., 803, which may be considered to be spatially coherent, is collimated and passes through a two-dimensional programmable phase coded mask, which is composed of l×l=$N_0$ rectangular pixels such that each pixel corresponds to binary 0 or π phase shift. For example, the output light of fiber 801 is passed through collimating lens 805 initially and then through programmable mask 811 which is implemented as a spatial light modulator (SLM). The output of mask 811 is delivered to mirror 815. As another example, the output light of fiber 803 is passed through collimating lens 807 initially and then through programmable mask 813 which is implemented as a spatial light modulator (SLM). The output of mask 813 is delivered to beam-splitter 817.

The output of the last beam-splitter 817 is the superposition of the optical inputs to each of the fibers (analogous to $S_T(x, y)$ discussed in Section 1.1), that is, the output of beam-splitter 817 is a linear combination of all the modulated light signals transmitted by masks 811–813.

The optical signal 818 composed of the superimposed light signals from beam-splitter 817 is passed to Fourier-transform lens 820 to obtain the spatial Fourier spectrum of optical signal 818 at the focal plane of the lens 820. The output of lens 820 is passed through hologram 830. The output of hologram 830 is passed to focusing lens 825. Finally, the output of lens 825 is passed to 2-dimensional fiber array 840, the details of which will be covered shortly. Again, the arrangement of lens 820, hologram 830, and focusing lens 825 is optical holographic matched filter 831.

As an operational example, if only one input fiber (e.g., 801) has an active input and hologram 830 has a transmitivity proportional to the conjugate Fourier transform of the coded mask (e.g., 811) associated with the input fiber, then the original collimated wave from lens 805 appears as an intense dot at the output of focusing lens 825 with a power proportional to the power on the input fiber because of the dispreading or focusing property of lens 825. Furthermore, in accordance with the present invention, when the coded mask (e.g., 805) is circularly shifted by some pixels (say via spatial light modulation) while hologram 830 remains fixed, the projected intense dot in the focal plane of focusing lens 825 tilts by the same amount as the circular shift from the center point of the focal plane. The overall switching capability of system 800 is accomplished by switch controller 851 via control signals on multi-path 852 to each SLM mask. The key point to emphasize is that a single, fixed hologram is sufficient to effect holographic switching (as contrasted to the other conventional techniques of the prior art wherein a multiplicity of holograms are required to effect switching).

Figure 9A:
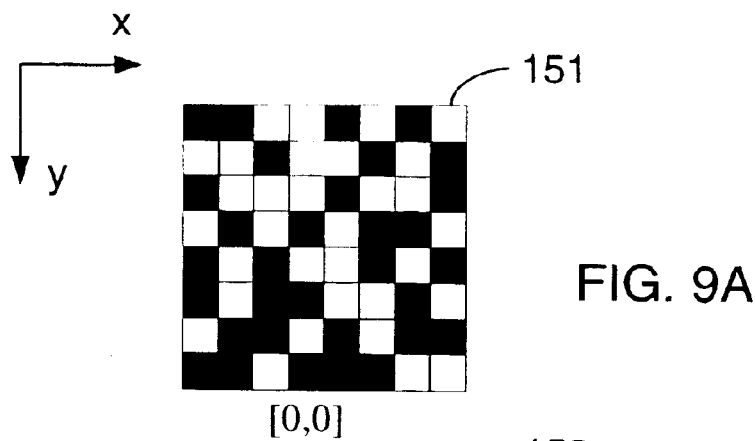
FIG. 9A is depicts an exemplary code.
Figure 9B:
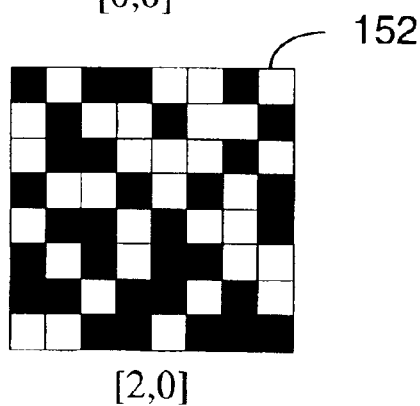
FIG. 9B is depicts a right shift of the exemplary code of FIG. 9A.
Figure 9C:
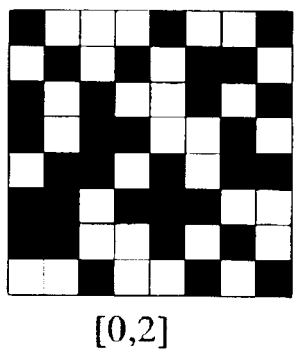
FIG. 9C is depicts an upward shift of the exemplary code of FIG. 9A.
Figure 9D:
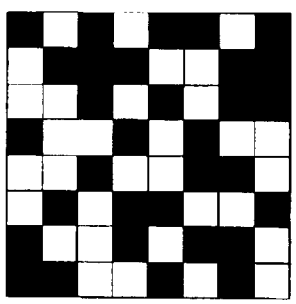
FIG. 9D is depicts both a left shift and downward shift of the exemplary code of FIG. 9A.

To elucidate this notion of "tilt", reference is made to FIGS. 9A–9D. In FIG. 9A there is shown a code designated [0,0]—the notation [h,v] is used to represent the code, with the x and y indicating horizontal and vertical spatial coordinates of the code. In FIG. 9B, the code is shifted two pixels to the right—hence the notation [2,0]. In FIG. 9C, the code of FIG. 9A is shifted upward by two pixels [0,2], whereas in FIG. 9D, the code of FIG. 9A is shifted left by two pixels and down by two pixels [−2,−2].

Figure 10A:
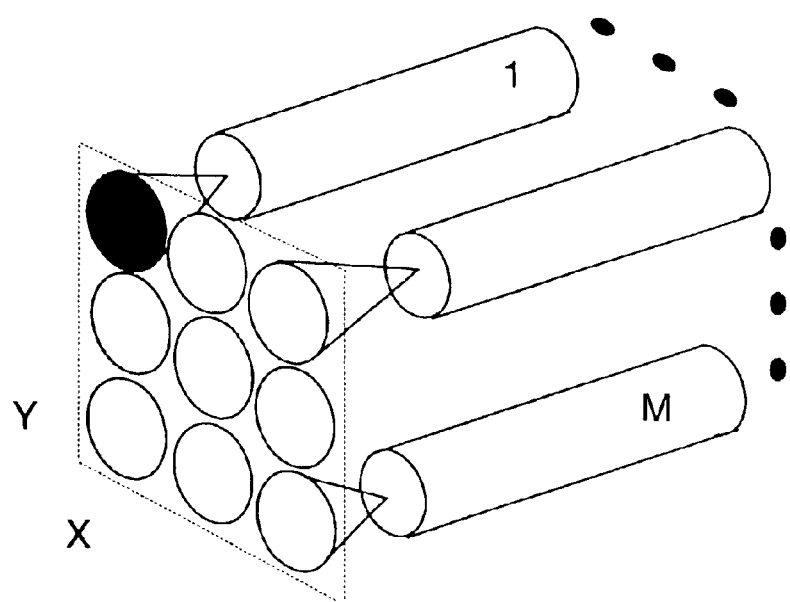
FIG. 10A illustrates the use of "tilt" in the 2-dimensional fiber array shown pictorially in FIG. 8 corresponding to a first input source.
Figure 10B:
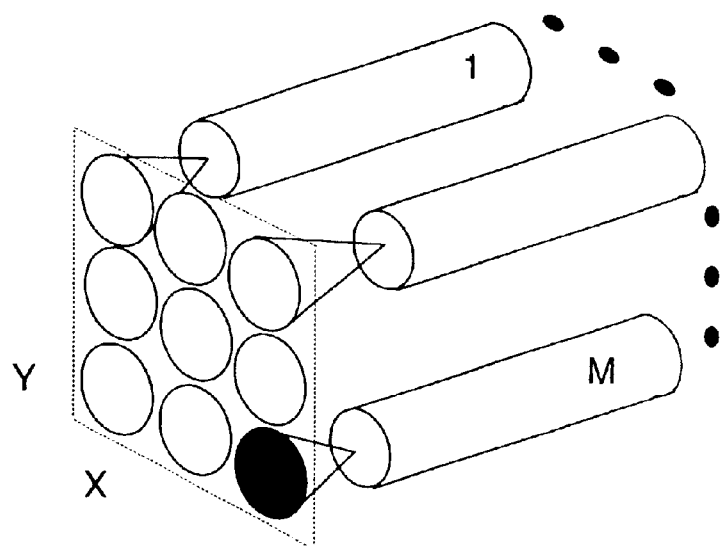
FIG. 10B illustrates the "tilt" corresponding to a second input source.

To further exemplify the use of "tilt" in conjunction with 2-dimensional fiber array 840, reference is made to FIG. 10A. In FIG. 10A, an exemplary 3×3 fiber array 1001 is shown as representative of the more general fiber array 840 of FIG. 8. As alluded to above, if only a single fiber is active, then an intense dot is projected onto array 1001. It is supposed in FIG. 10A that the unshifted code projects on the dark "dot' in the upper left corner of the array. If the mask associated with this fiber is circularly shifted via spatial light modulation, then the projected dot shifts—an example of which is shown in FIG. 10B. In FIG. 10B, then dark "dot" appears at the lower right corner of the array.

Figure 10C:
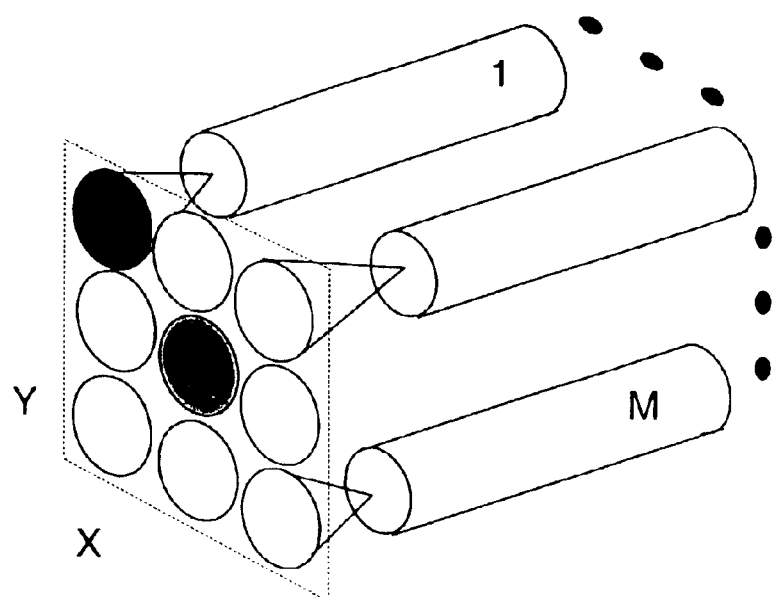
FIG. 10C illustrates the "tilt" for the combination of sources corresponding to FIGS. 10A and 10B, respectively.

Consider now the example of FIG. 10C. To obtain this illustration, it is presumed that two input fibers are active, and that the first active fiber has a mask corresponding to the unshifted code with a "dark" dot appearing at the upper left corner of the array, and the second active fiber has a mask corresponding to a shifted code such that the projected "gray" dot appears at the center of the array.

Figure 10D:
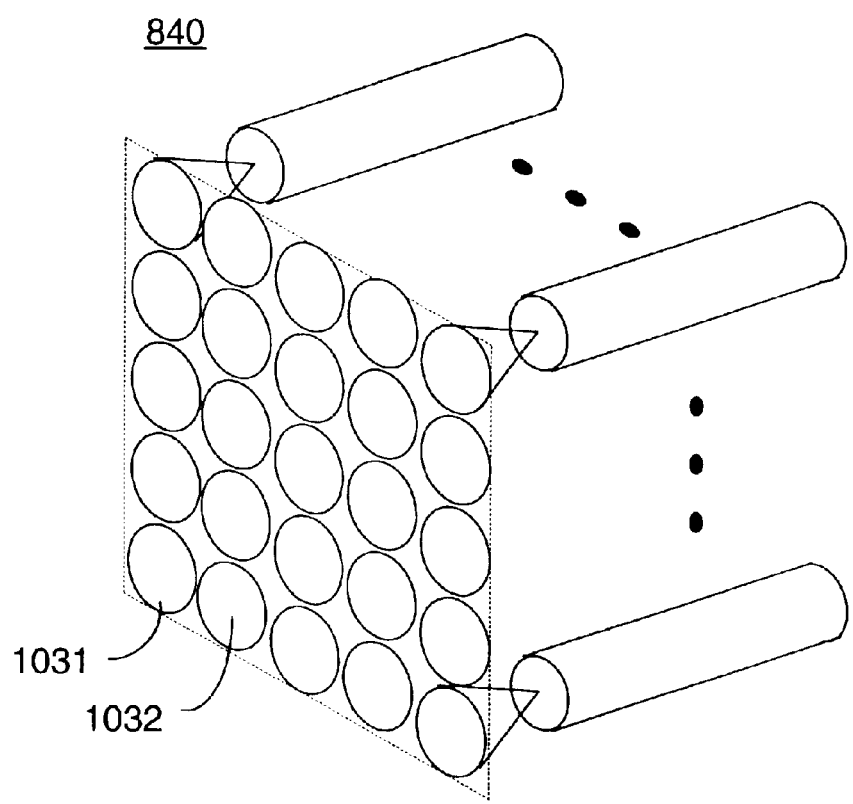
FIG. 10D illustrates the general arrangement of the microlens array.

By way of generalization, if the distances among the projected dots are sufficiently large, then signals giving rise to the projected dots can be separated easily and be transferred into the output optical fibers. An example of an arrangement to accomplish separation and transfer of the despread signals is a microlens array. FIG. 10D depicts the general structure of the microlens array 840 and the location of the fibers relative to the microlens array for an M-fiber system. It is assumed that there is sufficiently large, that is, there is sufficient interstitial spacing among the each microlens (e.g., 1031 and 1032) in array 840.

Figure 11A:
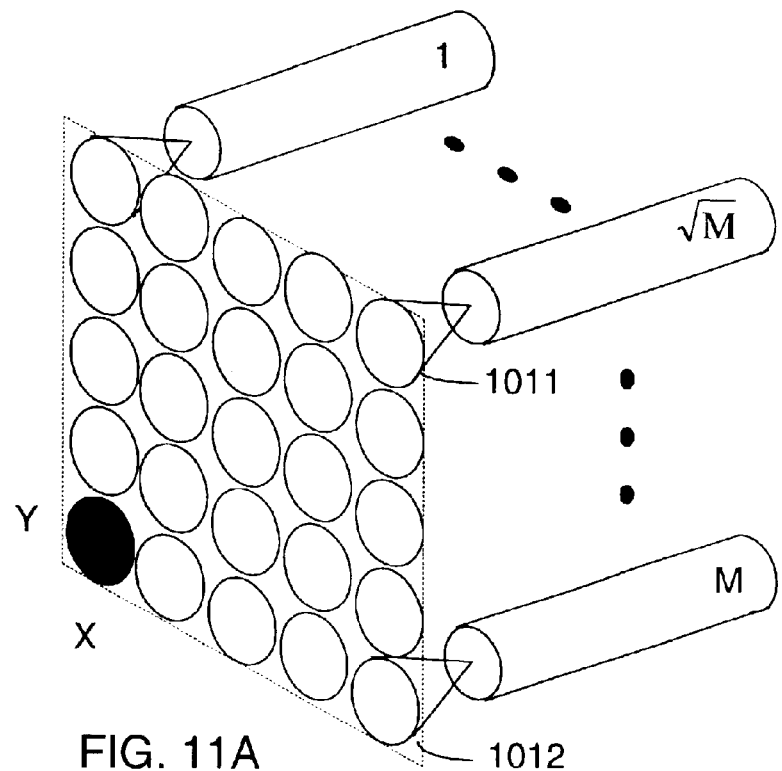
FIG. 11A illustrates the appearance of the "intense" received signals corresponding to a first code mask and a second unique code mask in the path of a first and second input signal, respectively.
Figure 11B:
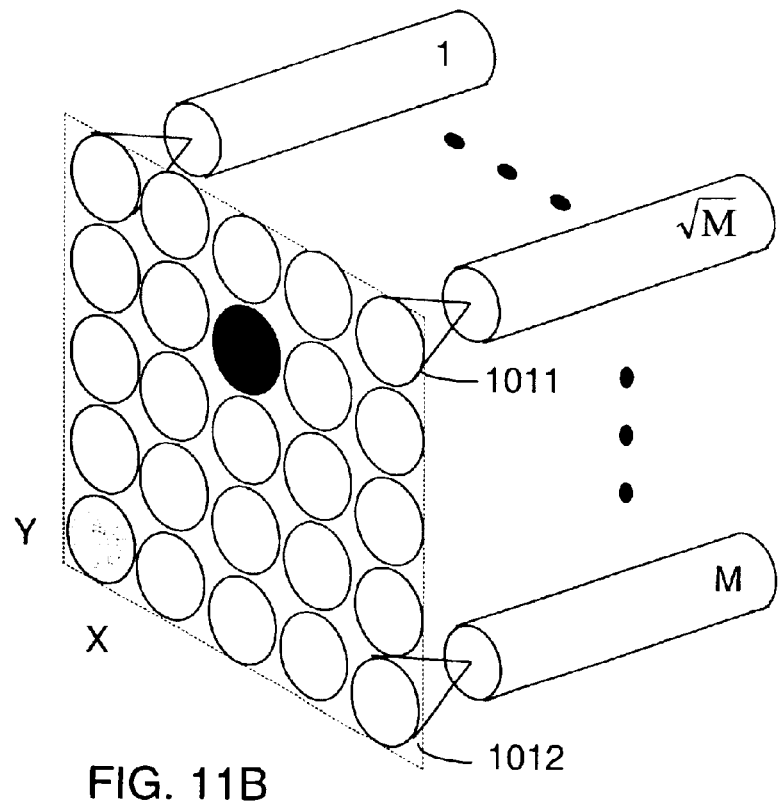
FIG. 11B illustrates how the appearance of the "intense" received signals of FIG. 11A can be interchanged by modulating the first code mask and the second unique code mask.

As a final example so as to clearly elucidate the switching aspect of system 800, suppose for: a given mask associated with fiber 801, the microlens in arrangement 840 of FIG. 11A currently receiving this input at the lower left corner of the array (1,1) (shown dark) as a result of an appropriate tilt corresponding to the circular shift of the given mask; another mask in associated with fiber 802 currently is received by (3,4) (shown gray) of microlens arrangement 840 due to another commensurate tilt. Now, as per FIG. 11B, if the given mask for fiber 801 is switched (via spatial light modulation) to be the new mask associated with fiber 802, and simultaneously the mask originally associated with fiber 802 is switched into the path of fiber 801, then the signal on fiber 801 is received at (3,4) in the microlens arrangement and the signal on fiber 802 is received at (1,1) of the microlens arrangement.

Figure 12A:
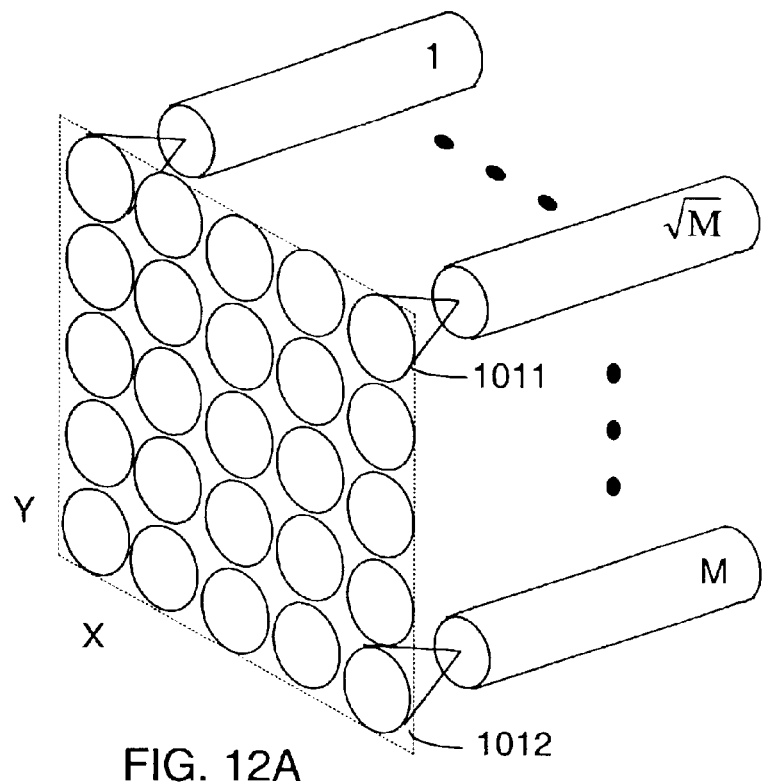
FIG. 12A is illustrative of the location of M output fibers in a generalized 2-dimensional array microlens.
Figure 12B:
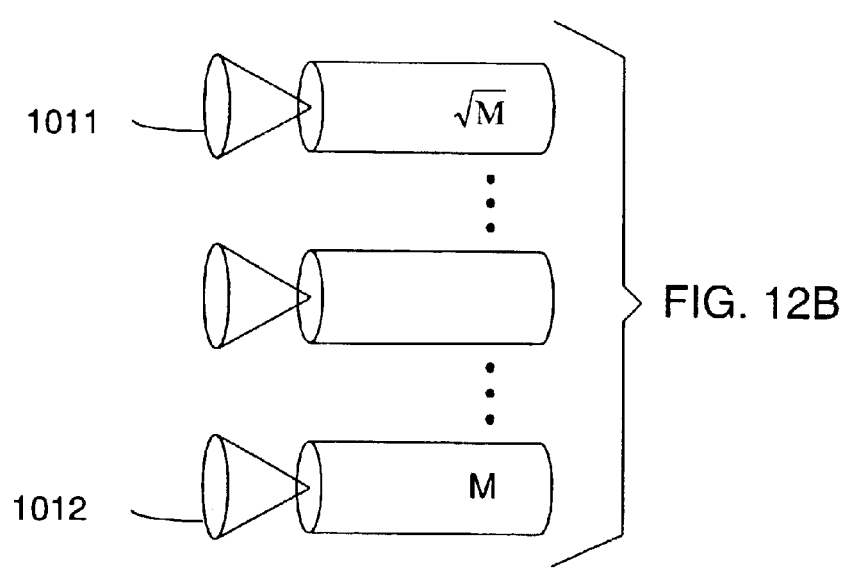
FIG. 12B is a cross-sectional view of the array of FIG. 12A.

By way of summary, reference is again made to FIG. 12A, wherein the M output fibers in a generalized 2-dimensional array are labeled for one embodiment. In particular, it is necessary to arrange the M output fibers into a 2-dimensional structure. Thus, in each dimension there are $\sqrt{M}$ fibers (note if $\sqrt{M}$ is not an integer, then only M fibers among $(int(\sqrt{M}+1))^2$ array positions). Moreover, specifically labeled are microlens 1011 and microlens 1012. A cross-sectional view of the array of FIG. 12A is shown in FIG. 12B wherein the cross-sectional dimensionality of microlens 1011 and microlens 1012 is explicitly depicted.

Figure 13A:
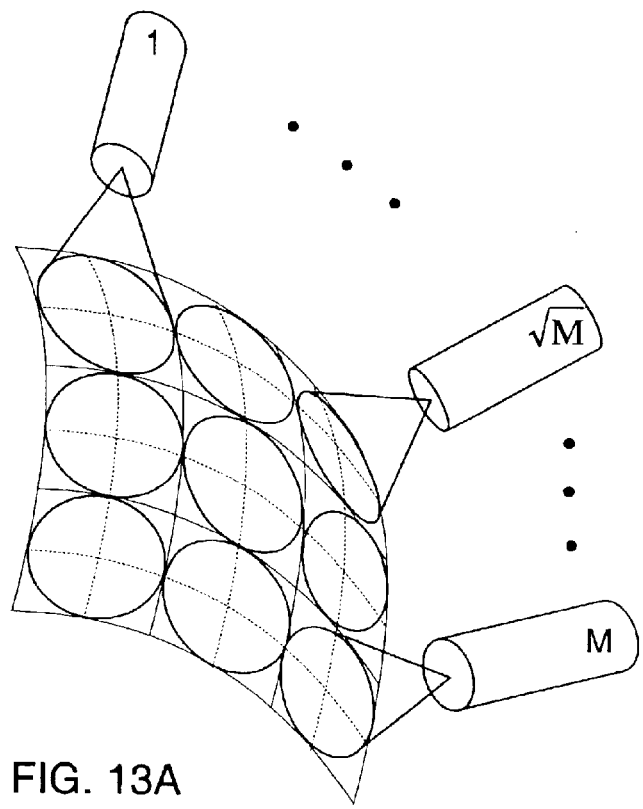
FIGS. 13A and 13B show the concave curvature to the microlens array.
Figure 13B:
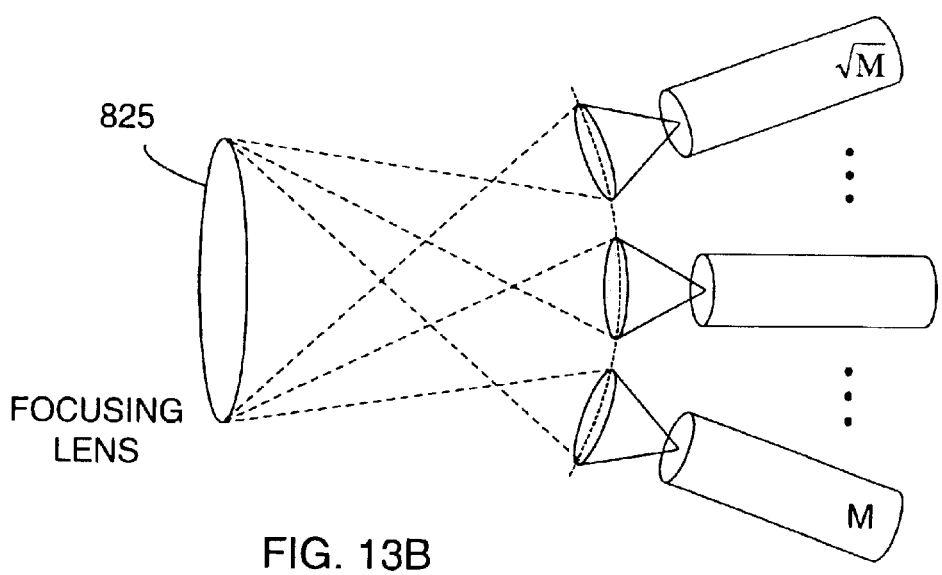

As it can be seen from FIG. 8, the inclination angles for elements of microlens array 840 are different. Hence, the multiple outputs of focused light from focusing lens 802 do not couple into output fibers off the main optical-axis as efficiently as the central output fiber. Mitigating the above problem, as illustrated in FIG. 13A, the plane of microlens can be slightly changed to have a concave curvature to make the microlenses perpendicular to the deflected beams. A cross-sectional view of the array of FIG. 13A including 825 focusing lens is shown in FIG. 13B. This arrangement ensures that the coupling loss remains as small as possible for all output optical fibers.

2.6 Flow Diagram

Figure 14:
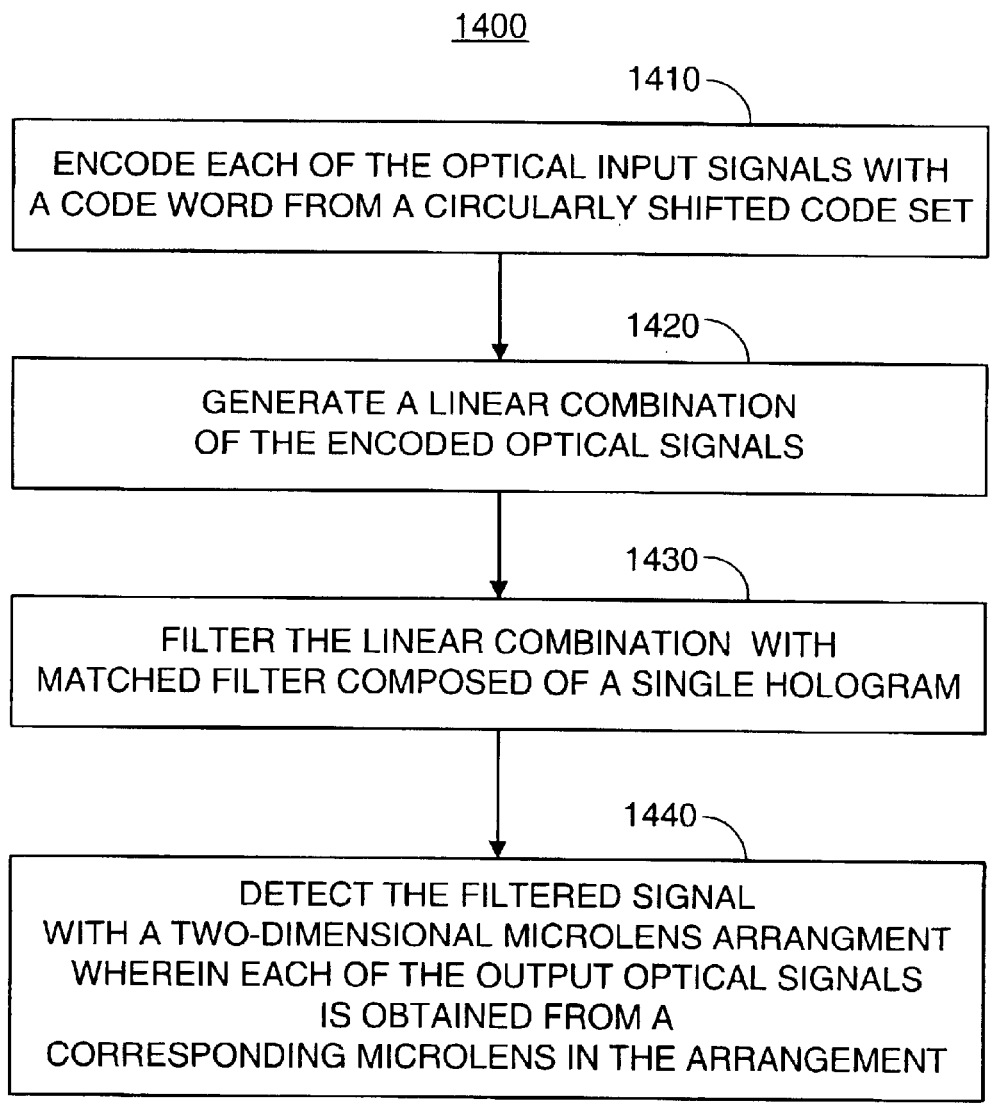
FIG. 14 is a flow diagram of an illustrative method in accordance with the present invention.

With reference to FIG. 14, there is shown flow diagram 1400 of a broad method aspect of the present invention for processing optical input signals to produce optical output signals. In particular, diagram 1400 depicts:

Encoding each of the optical input signals via processing block 1410.

Generating a linear combination of the encoded optical signals via processing block 1420.

Filtering the linear combination with a matched filter composed of a single hologram via processing block 1430.

Finally, detecting the filtered signal with a two-dimensional microlens arrangement coupled to the matched filter wherein each of the optical output signals is obtained from a corresponding microlens in the arrangement via processing block 1440.

Although the embodiments of the present invention have been shown and described in detail herein, those skilled in the art can readily devise many other varied embodiments that still incorporate these teachings. Thus, the previous description merely illustrates the principles of the invention. It will thus be appreciated that those with ordinary skill in the art will be able to devise various arrangements, which although not explicitly described or shown herein, embody principles of the invention and are included within its spirit and scope. Furthermore, all examples and conditional language recited herein are principally intended expressly to be only for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, that is, any elements developed that perform the function, regardless of structure.

In addition, it will be appreciated by those with ordinary skill in the art that the block diagrams herein represent conceptual views of illustrative circuitry embodying the principles of the invention.

What is claimed is:

1. An optical system for processing optical input signals to produce optical output signals comprising
   a spatial light modulator coupled to the each of the optical input signals for encoding the corresponding one of the input optical signals, said encoding utilizing a unique, two-dimensional circular shift of a single two-dimensional code word,
   a combiner for generating a linear combination of the optical signals emitted by each modulator,
   a matched filter composed of a single fixed hologram for receiving the linear combination, said hologram being configured in correspondence to a two-dimensional circular shift of said single code word, and
   a two-dimensional microlens arrangement coupled to the matched filter wherein each of the optical output signals is offset in two dimensions in correspondence to the circular shift of said single code word used to encode the corresponding one of the input signals and is directed to a corresponding microlens in the arrangement based on the offset.

2. The system as recited in claim 1 wherein the optical matched filter includes the cascade of: a Fourier Transform lens for transforming the linear combination; the hologram positioned at the output of the Fourier Transform lens; and a focusing lens for receiving the output of the hologram.

3. The system as recited in claim 1 wherein the collection of all circular shifts of the single code word compose a set of code words and the offset of the optical signal emitted from the hologram for each of the input singles is horizontally and vertically oriented in correspondence to said each of the code words.

4. The system as recited in claim 1 wherein the microlens arrangement is configured with a curvature to maximize the energy in the optical output signals.

5. An optical system for switching optical input signals to obtain switched optical output signals comprising
   a spatial light modulator coupled to the each of the optical input signals for encoding the corresponding one of the input optical signals, the encoding being based upon a circularly shifted code set composed of code words,
   a controller, coupled to each light modulator, for assigning a unique one of the code words to each light modulator,
   a combiner for generating a linear combination of the optical signals transmitted by each modulator,
   a matched filter composed of a single hologram based upon a single word from the code set for receiving the linear combination, and
   a two-dimensional microlens arrangement coupled to the matched filter wherein each of the output optical signals is obtained from a corresponding microlens in the arrangement.

6. The system as recited in claim 5 wherein the optical matched filter includes the cascade of: a Fourier Transform lens for transforming the linear combination; the hologram positioned at the output of the Fourier Transform lens; and a focusing lens at the output of the hologram.

7. The system as recited in claim 5 wherein the hologram is generated with reference to one of the code words.

8. The system as recited in claim 7 wherein the path of the optical signal emitted from the hologram for each of the code words in the linear combination is horizontally and vertically offset in correspondence to said each of the code words.

9. The system as recited in claim 5 wherein the microlens arrangement is configured with a curvature to maximize the energy in the optical output signals.

10. An all-optical receiver for processing a linear combination of optical input signals obtained by modulating each of the input optical signals with a code word from a given circularly shifted code set to produce a corresponding set of optical output signals, the receiver comprising
    a matched filter composed of a single hologram based upon one word from the code set for receiving the linear combination, and
    a two-dimensional microlens arrangement coupled to the matched filter wherein each of the optical output signals is obtained from a corresponding microlens in the arrangement.

11. The receiver as recited in claim 10 wherein the optical matched filter includes the cascade of: a Fourier Transform lens for transforming the linear combination; the hologram positioned at the output of the Fourier Transform lens; and a focusing lens at the output of the hologram.

12. The system as recited in claim 10 wherein the microlens arrangement is configured with a curvature to maximize the energy in the optical output signals.

13. A method for processing optical input signals to produce optical output signals comprising
    encoding each of the optical input signals with a spatial light modulator to produce encoded output signals and wherein the encoding is based upon a circularly shifted code set composed of code words derived from a single code,
    generating a linear combination of the encoded optical signals,
    filtering the linear combination with a matched filter composed of a single hologram and wherein the hologram is generated with reference to one of the code words, and
    detecting the filtered signal with a two-dimensional microlens arrangement coupled to the matched filter wherein each of the optical output signals is obtained from a corresponding microlens in the arrangement.

14. The method as recited in claim 13 wherein the encoding includes modulating each of the optical input signals with a spatial light modulator based upon a unique one of the code words.

15. The method as recited in claim 13 further including configuring the microlens arrangement with a curvature to maximize the energy in the optical output signals.

16. A method for processing a linear combination of received optical input signals obtained by modulating each of the input optical signals with a code word from a given circularly shifted code set to produce a corresponding set of optical output signals, the receiver method comprising
    filtering the linear combination with a matched filter composed of a single hologram configured from a single, pre-determined code word from the code set, and
    detecting the filtered signal with a two-dimensional microlens arrangement coupled to the matched filter wherein each of the optical output signals is obtained from a corresponding microlens in the arrangement.

17. The method as recited in claim 16 further including configuring the microlens arrangement with a curvature to maximize the energy in the optical output signals.

18. An optical method for switching optical input signals to obtain switched optical output signals comprising
    interposing a spatial light modulator into the path of each of the optical input signals,
    defining a circularly shifted code set composed of code words based upon a single code word and assigning, via a switching controller, a unique one of the code words to each light modulator to encode each corresponding one of the optical input signals,
    generating a linear combination of the optical signals transmitted by each modulator,
    filtering the linear combination with a matched filter composed of a single hologram based upon a single word from the code set, and
    detecting the filtered signal with a two-dimensional microlens arrangement coupled to the matched filter wherein each of the switched optical output signals is obtained from a corresponding microlens in the arrangement.

* * * * *